United States Patent [19]

Bohnel

[11] Patent Number: 4,786,696

[45] Date of Patent: Nov. 22, 1988

[54] PROCESS FOR THE PREPARATION OF TACKY POLYMERIC MICROSPHERES

[75] Inventor: Bernd Bohnel, Stillwater, Minn.

[73] Assignee: Minnesota Mining and Manufacturing Company, St. Paul, Minn.

[21] Appl. No.: 171,140

[22] Filed: Mar. 18, 1988

Related U.S. Application Data

[63] Continuation of Ser. No. 11,737, Feb. 6, 1987, abandoned.

[51] Int. Cl.$^4$ ................................................ C08J 2/00
[52] U.S. Cl. .................................... 526/88; 524/558; 524/560; 526/328
[58] Field of Search ................... 524/558, 560; 526/88, 526/328

[56] References Cited

U.S. PATENT DOCUMENTS 3,615,972  10/1971  Morehouse, Jr. et al. ............ 521/56
3,691,140  9/1972   Silver ................................. 524/829
4,049,604  9/1977   Morehouse, Jr. et al. ......... 526/203
4,166,152  8/1979   Baker et al. ......................... 524/745

Primary Examiner—Morton Foelak
Attorney, Agent, or Firm—Donald M. Sell; Gerald F. Chernivec; Darla P. Neaveill

[57] ABSTRACT

A process for the preparation of infusible, solvent-insoluble, solvent-dispersible, inherently tacky elastomeric polymeric microspheres without the use of a suspension stabilizer comprising the steps of: (a) charging to a reaction vessel: (1) at least one alkyl acrylate or methacrylate ester monomer; (2) at least one emulsifier at a concentration above its critical micelle concentration; and (3) an effective amount of at least one substantially water insoluble polymerization initiator; (b) agitating the reaction vessel charge prior to the initiation of the reaction sufficient to create a suitable monomer/water emulsion in the reaction vessel; and (c) maintaining the agitation for a time sufficient to allow substantially complete conversion of the monomer. This process forms elastomeric, solvet-dispersible, polymeric micropheres.

18 Claims, No Drawings

PROCESS FOR THE PREPARATION OF TACKY POLYMERIC MICROSPHERES

This is a continuation of application Ser. No. 011,737, filed Feb. 6, 1987, now abandoned.

TECHNICAL FIELD

This invention relates to a novel process for the preparation of inherently tacky, elastomeric, solvent-dispersible, solvent-insoluble polymeric microspheres.

BACKGROUND ART

In U.S. Pat. No. 3,691,140 to Silver, there are disclosed inherently tacky acrylate copolymer microspheres comprising a major portion of at least one alkyl acrylate ester and a minor portion of an ionic comonomer. As discussed in this patent, the microspheres can be prepared utilizing suspension polymerization techniques, which, prior to Silver, were considered unsuitable for the preparation of tacky polymers. In the technique described by Silver, the microspheres are prepared utilizing an emulsifier in a concentration greater than the critical micelle concentration without the necessity of externally added protective colloids or the like. The Silver microspheres are taught to be copolymeric in nature, requiring an ionic comonomer as an essential component thereof.

In U.S. Pat. No. 4,166,152 to Baker et al., it is disclosed that inherently tacky microspheres having physical properties similar to those disclosed in the Silver patent, i.e., inherent tack, infusibility, solvent dispersibility and solvent insolubility, can be prepared based not only on copolymers, but also on homopolymers, and which do not require the containment of an ionic comonomer. The microspheres are again taught to be prepared by aqueous suspension polymerization, and have a suspension stabilizer and an emulsifier as essential ingredients in their preparation.

In contradistinction to the foregoing patents, I have now discovered a process for the preparation of microspheres having physical properties similar to those of the prior patents, but which do not require the containment of an ionic comonomer therein, and do not require a suspension stabilizer in their preparation. These microspheres may be homopolymers or copolymers, are formed from alkyl acrylate or methacrylate monomers, and may also include a minor portion of a nonionic, vinylic comonomer.

DISCLOSURE OF THE INVENTION

In accordance with the invention there is provided an aqueous suspension polymerization process for the preparation of inherently tacky, infusible, solvent-insoluble, solvent-dispersible, elastomeric polymeric microspheres using oleophilic, water-emulsifiable alkyl acrylate or methacrylate monomers. The process utilizes emulsifiers in an amount greater than the critical micelle concentration and requires agitation of the vessel charge prior to the initiation of the reaction sufficient to create a suspension of monomer droplets having an average monomer droplet size of between about 5 and about 70 microns, but does not require the use of an ionic suspension stabilizer.

DETAILED DESCRIPTION OF THE INVENTION

Useful alkyl acrylate or methacrylate ester monomers herein are those which are oleophilic, water emulsifiable, of restricted water-solubility, and which, as homopolymers, generally exhibit glass transition temperatures below about −20° C. Exemplary monomers suitable for the preparation of the microspheres utilizing the process of the invention include n-butyl acrylate, sec-butyl acrylate, 2-methyl butyl acrylate, 4-methyl-2-pentyl acrylate, 2-ethyl hexyl acrylate, isooctyl acrylate, isodecyl methacrylate, and the like. Alkyl acrylate and methacrylate monomers affording polymers with glass transition temperatures higher than −20° C. (i.e., butyl methacrylate, isobornyl acrylate, or the like) may be utilized in conjunction with one of the above described monomers as long as the glass transition temperature of the resultant polymer is below about −20° C.

In addition to the foregoing, the tacky nature of the microspheres may be varied by inclusion of a minor portion of a nonionic, vinylic comonomer, examples thereof being acrylic acid, ethyl acrylate, hydroxyethyl methacrylate, divinyl benzene, N-t-octyl acrylimide. Again, the glass transition temperature of the resultant polymer should be below about −20° C.

The process utilizes at least one emulsifier in a concentration greater than the critical micelle concentration, defined as that minimum emulsifier concentration necessary for the formation of micelles. This concentration is slightly different for each emulsifier, usable concentrations typically ranging from about $1.0 \times 10^{-4}$ to about 3.0 moles/liter.

Emulsifiers useful herein may be anionic, nonionic or cationic in nature. Typical examples of anionic emulsifiers include sodium dodecylbenzene sulfonate, ammonium lauryl sulfate, sodium salts of alkyl aryl ether sulfonates, and the like. Examples of nonionic emulsifiers are ethoxylated oleyl alcohol and polyoxyethylene[9] octylphenyl ether. An example of a cationic surfactant is a mixture of alkyl dimethylbenzyl ammonium chlorides, wherein the alkyl chain is from ten to eighteen carbons long. While only examples of anionic, nonionic and cationic emulsifiers are given herein, it is believed that amphoteric emulsifiers would likewise work.

Polymerization initiators for polymerizing the monomer or monomers to provide suitable microspheres are those which are normally acceptable for free-radical polymerization of acrylate monomers, and which are oil-soluble and of very low solubility in water, examples thereof being benzoyl peroxide, lauroyl peroxide and bis (4-t-butyl cyclohexyl)peroxy dicarbonate. The use of initiators with substantial water-solubility is avoided as they afford a product contaminated with latex polymer.

An effective concentration of initiator should be used, which is believed to be from about 0.10 to about 1.0 percent by weight of the total monomers, and more preferably from about 0.25 to about 0.70 percent by weight. The amount of initiator used must be sufficient to bring about a complete monomer conversion in a desired time span and temperature range. Parameters which affect the concentration of initiator employed include the type of the initiator and the particular monomer or monomers involved.

The technique of my invention utilizes a modified version of the aqueous suspension polymerization technique detailed in the above-referenced patents. Suspension polymerization is a procedure whereby a monomer is dispersed in a medium (usually aqueous) in which it is insoluble, and the polymerization allowed to proceed within the individual monomer droplets. Monomer-soluble free-radical initiators are used. The kinetics and the mechanism are essentially those for the corresponding bulk polymerization under the same conditions of temperature and initiator concentration (referred to the monomer phase only).

Oxygen ($O_2$) dissolved in the reaction mixture inhibits the polymerization and must be expelled before the reaction can initiate. Passage of a gas which is inert to the system into the reaction vessel is an effective means of deoxygenation. Nitrogen ($N_2$) is preferred but $CO_2$, He, Ar, Kr, Xe, Ne or other inert gases would also be suitable. In addition to thorough deoxygenation, sufficient free-radicals must be present to initiate the reaction. This may be achieved through several means well known in the art. In the examples contained herein, heat is applied until thermal decomposition of the initiators generates a sufficient number of free radicals to start the reaction. The temperature at which this occurs varies greatly depending on the initiator used.

Either thorough deoxygenation or sufficient heating can be the final step prior to initiation of the reaction. In the case of an initiator capable of starting a reaction at room temperature, it may be desirable to maintain an $O_2$ atmosphere while agitating the reaction mixture until initiation is desired, at which time the vessel charge is purged with, for example, $N_2$. When an initiator having a higher initiation temperature is used, (e.g., 75° C.), the reaction mixture, being agitated at room temperature, may be purged with, for example, $N_2$ and the reaction initiated by heating.

I have discovered that if the reaction mixture is sufficiently preemulsified so that a suitable suspension of monomer droplets is formed prior to the initiation of the polymerization reaction, useful adhesive in microsphere form can be prepared without the necessity of an ionic suspension stabilizer being utilized in the process as is required by the Baker et al. patent. Baker teaches that suspension stabilizers having an interfacial tension of at least about 15.0 dynes per centimeter are required to prevent possible agglomeration. With agitation of the vessel charge, prior to initiation, sufficient to create a suitable suspension of monomer droplets, the desired microspheres can be consistently prepared without the use of a suspension stabilizer.

While specific time and stirring speed parameters are difficult to assign, I have discovered that, in most cases, it is necessary to preemulsify until the reaction mixture reaches a state where the average monomer droplet size is between about $5\mu$ and about $70\mu$ and preferably between $30\mu$ and $50\mu$. The average size decreases with increased and prolonged agitation of the reaction mixture. If the reaction is initiated while the average monomer droplet size is too large, agglomeration is likely to occur. Using a suspension stabilizer as taught by the Baker patent, it was possible to initiate the reaction when the average monomer droplet size was greater. Average droplet size can be measured with the commercially available Leeds & Northrup Microtrac TM particle-size analyzer.

The Baker and Silver patent examples teach reaction times as long as 20 hours while I have discovered that complete monomer conversion can occur with my process in usually about one or two hours. The heating and stirring of the reaction mixture beyond the point of complete monomer conversion is not only unnecessary but can cause agglomeration. This phenomenon can become very pronounced when the average monomer droplet size is greater than about $70\mu$.

The point of complete monomer conversion can be determined through the use of techniques well known in the art. Gas chromatography, liquid chromatography, nmr, and gravimetric techniques are all suitable. Gravimetric techniques are preferred, as they are the simplest and least expensive.

In similar fashion to the microsphere characteristics disclosed by the prior patents, following polymerization, the aqueous suspension of polymeric microspheres is stable to agglomeration or coagulation under room temperature conditions. The polymer suspension may have non-volatile solids contents from about 10 to about 50 percent by weight. Upon prolonged standing the suspension may separate into two phases, one being aqueous and in essence free of polymer, the other being an aqueous suspension of the polymeric spheres. The degree and type of separation is dependent on the density of the resultant polymer. Separation of the polymer phase provides an aqueous suspension having a non-volatile solids content of up to about 75%.

If desired, the aqueous suspension of microspheres may be utilized immediately following the suspension polymerization to provide inherently tacky coatings or adhesives. The aqueous suspension can also be coagulated with, e.g., methanol, saturated salt solutions or the like, followed by washing and drying. The spheres are normally tacky and elastomeric, are insoluble in organic solvents and will with sufficient agitation form dispersions in many common solvents.

Typically useful solvents are ethyl acetate, tetrahydrofuran, heptane, 2-butanone and other ketones, benzene, cylcohexane, isopropanol and higher alcohols. The spheres will not disperse in polar solvents such as water, methanol and ethanol. When dispersed the spheres absorb the solvent and swell. After dispersion, the spheres will remain homogeneously dispersed for extended periods of time.

A force applied directly to one of the spheres will deform it; however, the spherical shape thereof is resumed upon release of the stress. Upon being heated, the spheres typically do not melt or flow, but will retain their integrity until their carbonization temperature is reached.

The resultant polymeric microspheres have diameters which are typically comparable to the monomer droplet size prior to initiation.

Microspheres can be utilized in aerosol adhesives, can be applied to substrates as an adhesive, such as disclosed in U.S. Pat. No. 3,857,731 and can be combined with a hot melt adhesive on a substrate to provide a positionable hot melt adhesive system, as is disclosed in U.S. Pat. No. 4,049,483.

The invention will now be more specifically described by the following non-limiting examples.

EXAMPLE 1

To a 1 liter, 3-necked flask equipped with a thermometer, a reflux condenser, a mechanical stirrer and a gas inlet tube were charged 300 grams of deionized water, 100 grams of isooctyl acrylate, 0.50 gram of "Lucidol 98", tradename for a 98 percent active benzoyl peroxide, commercially available from the Pennwalt Corporation, and 2.0 grams of "Siponate DS-10", tradename for sodium dodecylbenzene sulfonate, commercially available from Alcolac, Inc. The agitation was set at 500 revolutions per minute (rpm) and the reaction mixture was purged with nitrogen. The stirring and nitrogen purge were maintained throughout the reaction period. The reaction mixture was allowed to stir at room temperature for 15 minutes and then was heated to 75° C. to initiate the reaction. The reaction became exothermic after 30 minutes of heating. After the exotherm had subsided, the batch was heated to 85° C. for 30 minutes.

The reaction mixture was then cooled to room temperature and filtered through a 16 mesh screen. Very little coagulum was observed to be present, the amount being less than about 1 percent based on the monomer charge. The resulting suspension was found to contain 25.7 percent solids, and the average particle size of the polymeric spheres was 37 microns.

EXAMPLES 2-9

Example 1 was duplicated using the following monomers, catalysts and surfactants, with similar results being achieved. The reagents and results are summarized in Tables 1 and 2.

TABLE 1

| Example | Monomers | Catalyst | Surfactant |
|---|---|---|---|
| 2 | 50 g butyl acrylate<br>50 g isooctyl acrylate | 0.50 g Ludicol 98 | 2.0 g Siponate DS-10 |
| 3 | 100 g isooctyl acrylate<br>3.0 acrylic acid | 0.50 g Lucidol 98 | 2.0 g Siponate DS-10 |
| 4 | 95 g isooctyl acrylate<br>5.0 g hydroxyethyl methacrylate | 0.50 g Lucidol 98 | 2.0 g Siponate DS-10 |
| 5 | 90 g isooctyl acrylate<br>10 g ethyl acrylate | 0.50 g Lucidol 98 | 2.0 g Siponate DS-10 |
| 6 | 100 g isooctyl acrylate | 0.50 g Alperox-F[1] | 2.0 g Siponate DS-10 |
| 7 | 100 g isooctyl acrylate | 0.50 g Lucidol 98 | 6.3 g Maprofix NH[2] |
| 8 | 100 g 2-ethylhexyl acrylate | 0.50 g Lucidol 98 | 2.0 g Siponate DS-10 |
| 9 | 100 g n-butyl acrylate | 0.50 g Lucidol 98 | 2.0 g Siponate DS-10 |

[1]Tradename for 98% active lauroyl peroxide, commercially available from the Pennwalt Corporation
[2]Tradename for a 27 to 30 percent aqueous solution of ammonium lauryl sulfate, commercially available from Onyx Chemical Company.

TABLE 2

| Ex. | Average Particle Size ($\mu$) | % Solids |
|---|---|---|
| 2 | 37 | 25.2 |
| 3 | 27 | 26.4 |
| 4 | 42 | 25.2 |
| 5 | 44 | 25.7 |
| 6 | 39 | 26.0 |
| 7 | 44 | 25.7 |
| 8 | 58 | 25.8 |
| 9 | 36 | 25.4 |

EXAMPLE 10

To illustrate the utility of a nonionic surfactant in my process the following was undertaken.

To a 1 liter 3-necked flask equipped with a thermometer, a reflux condenser, a mechanical stirrer and a gas inlet tube were charged 200 grams of isooctyl acrylate and 1.0 gram of "Percadox 16", tradename for a 98 percent active bis(4-t-butyl cyclohexyl) peroxydicarbonate, commercially available from the Noury Chemical Corp. The agitation was set at 200 rpm, this speed being maintained throughout the reaction procedure. After 10 minutes, a solution of 5.0 grams of "Triton X-100", tradename for a polyoxyethylene[9] octylphenyl ether, commercially available from Rohm & Haas, in 200 grams of deionized water was added. After 15 minutes of stirring a nitrogen purge was initiated and the reaction mixture was heated to 35° C. to initiate the reaction. The reaction became exothermic after 45 minutes of heating, and it was cooled to allow for a maximum exotherm temperature of 69° C. The batch was then heated to 60° C. for an additional 35 minutes, cooled to room temperature, and filtered through a 16 mesh screen.

Very little coagulum was observed to be present, the amount being less than about 1 percent based on the monomer charge. The resulting suspension was found to contain 51.7 percent solids, and the average particle size of the polymeric spheres was 58 microns.

EXAMPLE 11

To illustrate the utility of a cationic surfactant in my process the following was undertaken.

To a 1 liter 3-necked reaction flask equipped with a thermometer, a reflux condenser, a mechanical stirrer and a gas inlet tube were charged 200 grams of isooctyl acrylate and 1.0 gram of "Percadox 16", tradename for 98 percent active bis [4-t-butyl cyclohexyl] peroxydicarbonate, commercially available from Noury Chemical Corp. The agitation was set to 700 rpm. After 10 minutes a solution of 20.0 grams of "Variquat 60LC", tradename for a solution of alkyl[$C_{10}$–$C_{18}$] dimethylbenzyl ammonium chlorides, commercially available from Sherex Chemicals, in 200 grams of deionized water was added. After 15 minutes of stirring a nitrogen purge was initiated and the reaction mixture was heated to 35° C. to initiate the reaction. The reaction became exothermic after 80 minutes of heating. After the temperature had reached 45° C. the agitation was set to 300 rpm and the contents were cooled to allow for a maximum exotherm temperature of 71° C. The batch was then heated to 60° C. for 40 minutes, cooled to room temperature and filtered through a 16 mesh screen. Very little coagulum was observed to be present, the amount being less than about 1 percent based on the monomer charge. The resulting suspension was found to contain 50.8 percent solids, and the average particle size of the polymeric spheres was 12$\mu$.

What is claimed is:

1. A process for the preparation of infusible, solvent-insoluble, solvent-dispersible, inherently tacky elastomeric polymeric microspheres without the use of a suspension stabilizer, consisting essentially of the steps of:
(a) concocting a reaction mixture by charging to a reaction vessel
   (i) one or more alkyl acrylate or methacrylate ester monomers or mixtures thereof
   (ii) at least one emulsifier at a concentration above its critical micelle concentration; and
   (iii) an effective amount of at least one substantially water insoluble polymerization initiator;
(b) agitating said reaction mixture sufficient to create a suspension of monomer droplets having an average monomer droplet size in the range of between about 5 microns and about 70 microns prior to the initiation of a reaction therein;
(c) initiating a reaction in said reaction vessel; and
(d) maintaining said agitation for a time sufficient to allow substantially complete conversion of said monomer; whereby elastomeric, solvent-dispersible, polymeric microspheres are formed.

2. The process of claim 1 wherein the final step prior to said reaction initiation is purging said reaction vessel with a gas selected from the group consisting of $N_2$, $CO_2$, He, Ne, Ar, Kr, and Xe.

3. The process of claim 1 wherein final step prior to said reaction initiation is heating said reaction mixture to a temperature sufficient to initiate said reaction.

4. The process of claim 1 wherein heating of said reaction mixture is maintained until substantially complete conversion of said monomer occurs.

5. The process of claim 1 wherein said at least one ester monomer forms homopolymers or co-polymers having a glass transition temperature of below about $-20°$ C.

6. The process of claim 5 wherein said at least one ester monomer is selected from the group consisting of n-butyl acrylate, sec-butyl acrylate, 2-methyl butyl acrylate, 4-methyl-2-pentyl acrylate, 2-ethyl hexyl acrylate, isooctyl acrylate, isodecyl methacrylate.

7. The process of claim 1 and also including charging said reaction vessel with a minor amount of a nonionic vinylic comonomer.

8. The process of claim 7 wherein said vinylic comonomer is selected from the group consisting of acrylic acid, ethyl acrylate, hydroxyethyl methacrylate, divinyl benzene, N-t-octyl acrylamide.

9. The process of claim 1 wherein said emulsifier is anionic.

10. The process of claim 9 wherein said emulsifier is selected from the group consisting of sodium salts of alkyl aryl ether sulfonates, sodium dodecylbenzene sulfonate, ammonium lauryl sulfate.

11. The process of claim 1 wherein said emulsifier is nonionic.

12. The process of claim 11 wherein said emulsifier is either ethoxylated oleyl alcohol or polyoxyethylene octylphenyl ether.

13. The process of claim 1 wherein said emulsifier is cationic.

14. The process of claim 13 wherein said emulsifier is an alkyl dimethylbenzyl ammonium chloride wherein the alkyl group has between 10 and 18 carbons inclusive.

15. The process of claim 1 wherein said agitation of step (b) comprises agitating said reaction mixture until the average monomer droplet size is between about 30 microns and about 50 microns.

16. The process of claim 1 wherein the concentration of said initiator is from about 0.1 to about 1.0 percent by weight of said monomer.

17. The process of claim 16 wherein the concentration of said initiator is from about 0.25 to about 0.70 percent by weight of said monomer.

18. The process of claim 2 wherein said gas is $N_2$.

* * * * *

UNITED STATES PATENT AND TRADEMARK OFFICE
CERTIFICATE OF CORRECTION

PATENT NO. : 4,786,696
DATED : NOVEMBER 22, 1988
INVENTOR(S) : BERND BOHNEL

It is certified that error appears in the above-identified patent and that said Letters Patent is hereby corrected as shown below:

Item [63] on the face of the patent,
entitled "Related U.S. Application Data" -
"abandoned." should be --abandoned, which is
a continuation in part of Ser. No. 825376,
February 3, 1986, abandoned.--.

Signed and Sealed this

Thirteenth Day of November, 1990

Attest:

HARRY F. MANBECK, JR.

*Attesting Officer*     *Commissioner of Patents and Trademarks*